United States Patent
Arruda et al.

(10) Patent No.: US 6,806,867 B1
(45) Date of Patent: Oct. 19, 2004

(54) PALM PAD SYSTEM

(75) Inventors: Joseph Arruda, Swansea, MA (US); Gregor Mittersinker, Warwick, RI (US); Robert Southworth, Mansfield, MA (US); A. Jason Mirabito, Hull, MA (US); Kenneth Rawlings, Douglas, MA (US)

(73) Assignee: A.T.X. International, Inc., Lincoln, RI (US)

( * ) Notice: Subject to any disclaimer, the term of this patent is extended or adjusted under 35 U.S.C. 154(b) by 0 days.

(21) Appl. No.: 09/474,545

(22) Filed: Dec. 29, 1999

Related U.S. Application Data

(60) Provisional application No. 60/135,894, filed on May 26, 1999, and provisional application No. 60/114,521, filed on Dec. 31, 1998.

(51) Int. Cl.[7] .............................................. G09G 5/00
(52) U.S. Cl. ................. 345/173; 345/169; 345/179; 345/748; 345/864; 345/901; 345/905; 178/18; 178/19
(58) Field of Search ................................ 345/173, 179, 345/748, 901, 905; 178/18.01, 18.03, 18.05, 18.1, 19.01, 20.01; 402/72–74

(56) References Cited

U.S. PATENT DOCUMENTS

| | | | | |
|---|---|---|---|---|
| 4,918,632 A | * | 4/1990 | York | 361/680 |
| 5,049,862 A | * | 9/1991 | Dao et al. | 361/679 |
| 5,215,398 A | * | 6/1993 | White et al. | 402/73 |
| 5,375,076 A | * | 12/1994 | Goodrich et al. | 361/681 |
| 5,434,371 A | | 7/1995 | Brooks | 178/18 |
| 5,476,336 A | * | 12/1995 | Osiecki et al. | 402/79 |
| 5,635,682 A | | 6/1997 | Cherdak et al. | 178/18 |
| 5,708,458 A | * | 1/1998 | Vrbanac | 345/156 |
| 5,745,716 A | * | 4/1998 | Tchao et al. | 345/777 |
| 5,808,862 A | * | 9/1998 | Robbins | 361/681 |
| 5,845,282 A | | 12/1998 | Alley et al. | 707/10 |
| 5,986,739 A | | 11/1999 | Kobayashi | 349/143 |
| 6,020,878 A | * | 2/2000 | Robinson | 345/173 |
| 6,054,979 A | * | 4/2000 | Sellers | 345/173 |
| 6,144,358 A | * | 11/2000 | Narayanaswamy et al. | 345/102 |
| 6,227,743 B1 | | 5/2001 | Robb | 401/243 |
| 6,239,968 B1 | * | 5/2001 | Kim et al. | 361/679 |
| 6,241,414 B1 | * | 6/2001 | Wien | 402/73 |
| 6,286,060 B1 | * | 9/2001 | DiGiorgio et al. | 710/31 |
| 6,311,042 B1 | * | 10/2001 | DeSchrijver | 455/66.1 |
| 6,362,440 B1 | * | 3/2002 | Karidis et al. | 178/18.01 |
| 6,396,481 B1 | * | 5/2002 | Challa et al. | 345/169 |

\* cited by examiner

*Primary Examiner*—Henry N. Tran
(74) *Attorney, Agent, or Firm*—Mintz Levin Cohn Ferris Glovsky and Popeo, P.C.

(57) ABSTRACT

A palm pad system including an electronic notepad coupled to a conventional personal digital device ("PDD") via a data bus is set forth that enables a user to transpose handwritten data into electronic files or pages. The notepad and PDD are mounted onto a common base. The base includes a retaining structure for retaining the notepad on the base and another retaining structure for retaining the PDD on the base. The base further includes a flexible portion that permits the base to be folded into a compact form for protecting the notepad and PDD during transport. A pen containing a transmitter is employed by the palm pad system to transmit a signal to receptive electronics while a user writes data on the notepad with a writing tip contained in the pen. The signal received by the electronics is processed to generate an electronic file representative of the user's handwritten data. The electronic file can be electronically stored and retrieved. The electronic file can also be displayed on a touch sensitive display, which is associated with the PDD, immediately after composition by the user.

7 Claims, 9 Drawing Sheets

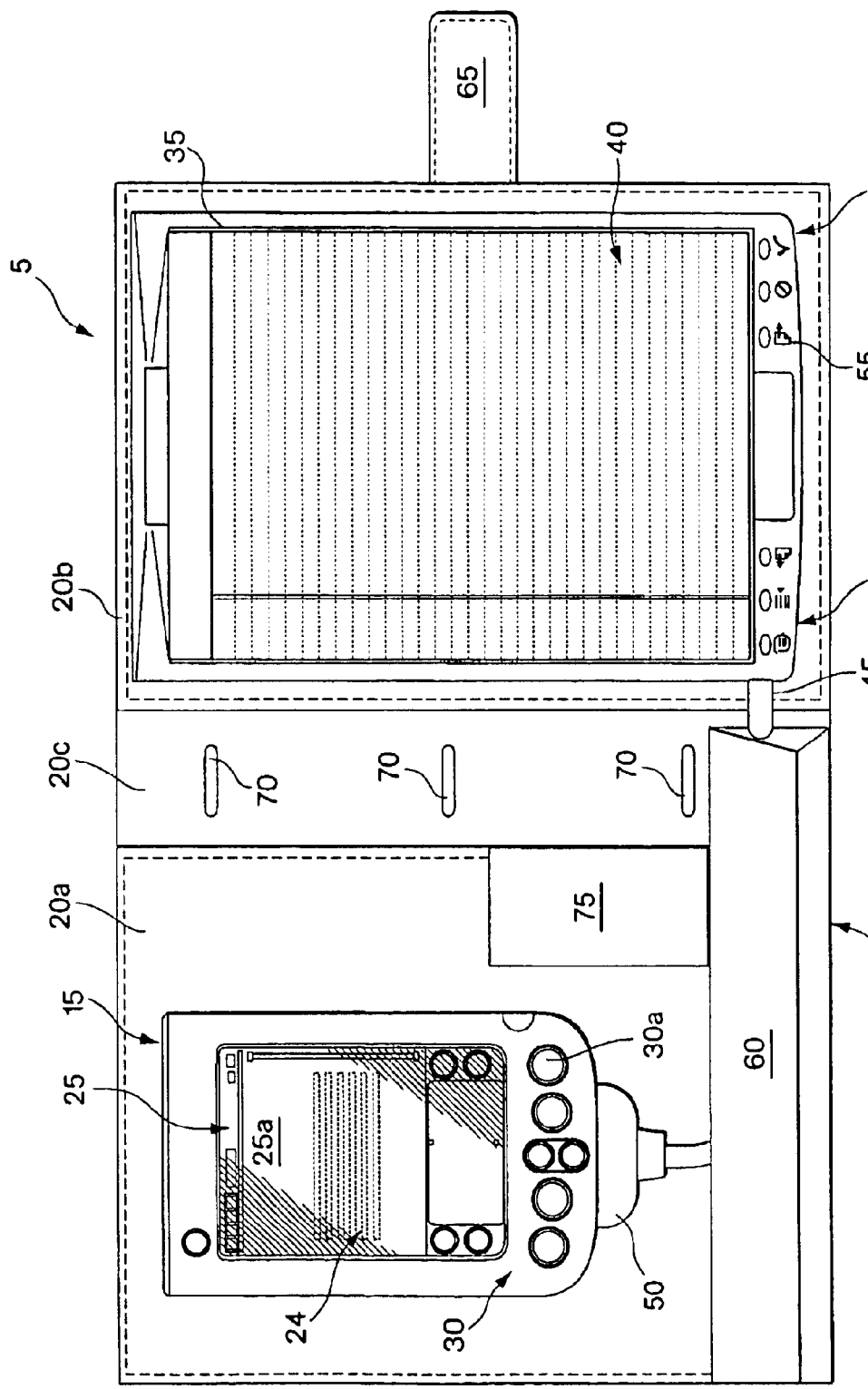

PALM PAD SYSTEM

RELATED APPLICATIONS

This application claims priority from Provisional Application No. 60/114,521 filed Dec. 31, 1999 and Provisional Application No. 60/135,894 filed May 26, 1999 both of which are herein incorporated by reference.

FIELD OF THE INVENTION

The present invention relates to a method and apparatus for providing electronic storage and retrieval of handwritten notes. More particularly, it relates to a method and apparatus for providing electronic storage and retrieval of handwritten notes, along with other drawings, in an electronic device such as a personal digital device (PDD).

BACKGROUND

Personal digital devices ("PDD") have become extremely popular for recording, storing and retrieving information. Examples of PDDs include personal computers, such as laptop computers and handheld computer devices having a display area and an input area. In one version of a handheld computer device, a user inputs information in the input area by writing with a specialized pen. The pen does not mark on the input area, but the PDD converts the writing to electronic information through a resistive contact surface. According to a common version of a PDD, the user writes in a specialized manner to represent alpha-numeric characters. Movement of the pen on the resistive contact surface is recognized by the PDD and converted into a corresponding character. Each character is created at the same location on the resistive contact surface. The characters are then displayed in the display area of the PDD. Depending upon the operation of the PDD the characters are stored in various formats to record information, such as names, addresses, telephone numbers, appointments, and notes. The PDD can be connected to another electronic device, such as a personal computer, for exchanging information with the other device.

While many PDDs are desirable because they are compact and portable, one drawback of typical prior art PDDs is that they use specialized writing systems that can be awkward to learn and may be hard for some users to master. Also, in typical prior art PDDs markings do not appear on the resistive contact surface during writing thereon. As a result, it can be difficult for users to track their writing portions to obtain the correct character, furthermore, non-character marks typically cannot be made or stored in prior art PDDs. Thus, drawings cannot be entered into the PDD. In addition, a PDD user typically enters characters one at a time, significantly limiting the speed with which one can take notes or record information. Therefore, a need exists for a PDD which allows users to write in a more fluid and familiar manner and to include noncharacters in their writing. In other words, a need exists for a PDD that records free-hand writing and/or drawing.

Various devices have been developed to convert written documents into electronic forms in order to reduce storage space and retrieval time. For example, scanners can convert previously existing documents into an electronic format for storage and retrieval. In addition, a personal computer using certain software packages can allow a user to input data, e.g., to create an original document such as a drawing. The user can input data in a variety of ways, e.g., using a mouse on a desktop. The personal computer can display the original document on a screen. Furthermore, the personal computer can store the input data in memory or on a magnetic storage disk.

Similarly, computers with touch screens and pads allow a user to create input data, e.g., to create an original document such as a handwritten note or a drawing, using a finger or stylus. Again, the computer can display the document on a screen and/or store it in an electronic format. However, creating an original document using one of these methods is somewhat awkward. The instrument used to mark on the touch screen or pad does not make a mark, and typically the user has to watch a separate display screen to observe what is recorded as a result of the writing motion.

A. T. Cross of Lincoln R. I. has a product, sold under the name CROSSPAD, which converts handwritten documents into electronic form. The product includes a conventional notepad combined with a unique pen and printed circuit board assembly ("PCBA") for the notepad. The user writes on the pad using the pen. The pen has an ink tip that can be used to make marks on the pad. The pen also includes a RF transmitter. The RF transmitter operates in conjunction with the PCBA for the pad to translate pen movement into electronic signals representing the user's writing motion. A switch in the pen turns the transmitter on when the pen is in contact with the pad. The switch is activated as a result of the force exerted by the pad on the tip of the pen. This system can be used to make electronic copies of handwritten notes. The electronic copies can then be stored and retrieved for later use. The user can write on the pad in an ordinary manner.

However, a need remains for a system which allows storage, retrieval and searching of content in electronic copies of handwritten information. In addition, a need exists for a portable PDD system that allows for the creation, storage, searching, and retrieval of handwritten information.

SUMMARY OF THE INVENTION

An object of the present invention is to set forth a palm pad system that overcomes deficiencies and limitations of the prior art.

In accordance with embodiments of the present invention, the palm pad system comprises an electronic notepad coupled to a conventional PDD. The electronic notepad and the PDD are retained in position on a common base. The electronic notepad includes an integrated printed circuit board having a plurality of etched loops formed thereon. The etched loops are uniformly distributed over the surface of the board and define an X-grid pattern and a Y-grid pattern. The X-grid pattern and Y-grid pattern are receptive to signals generated by a source, which source is positioned in close proximity to the grid patterns defined on the notepad. The electronic notepad further includes a paper-pad, which is securely mounted adjacent to the printed circuit board.

The source for generating the signals can be an electromechanical transmitter, which transmitter is mounted in an elongated pen. The pen further includes a first end having a conventional retractable writing tip, such as a ball point pen tip, for marking on paper. The writing tip is coupled to the electromechanical transmitter via a micro-switch. The micro-switch is pressure actuated so that when the writing tip is pressed against a writing surface, such as the paper-pad, the transmitter coupled therewith is enabled for generating the signal. The signal is sensed by the X-grid pattern and the Y-grid pattern. The signal sensed by the X-grid pattern and the Y-grid pattern is further processed by electronics coupled therewith to determine the relative location of the writing tip with respect to the paper-pad. When a user composes handwritten data by moving the writing tip of the pen over the paper-pad, the relative locations of the writing tip are processed to concomitantly reproduce and electronically display the handwritten data on a display associated with the PDD. The electronically reproduced data can further be saved as an electronic file, which file can be retrieved at a later time.

The pen further includes a cap having an aperture with a retractable non-writing tip mounted therein. When the cap is positioned over the writing tip, which is defined at the first end of the pen, the non-writing tip cooperates with the first end of the pen to force the non-writing tip into a retracted position defined in the cap. When the cap is positioned over a second end of the pen, the non-writing tip cooperates with the second end of the pen to force non-writing tip, which tip is defined in the cap, to extend outwardly from the aperture defined on the cap.

In another embodiment, the palm pad system for enabling a user to electronically display, store, and retrieve hand written data comprises a means for converting handwritten data into an electronic file. The means for converting handwritten data into an electronic file is retained on a base. The palm pad system further comprises a means for receiving and processing the electronic file. The means for receiving and processing the electronic file is also retained on the base. The means for receiving and processing the electronic file is constructed and arranged to display, store, and retrieve the electronic file. In an embodiment, the means for receiving and processing the electronic file comprises a means for displaying the electronic file; a means for storing the electronic file; a means for retrieving the electronic file; and a control means for controlling the displaying, storing and retrieving of the electronic file.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1(a) is a planar view of a palm pad system in accordance with one embodiment of the present invention;

DETAILED DESCRIPTION

Figure 1B:
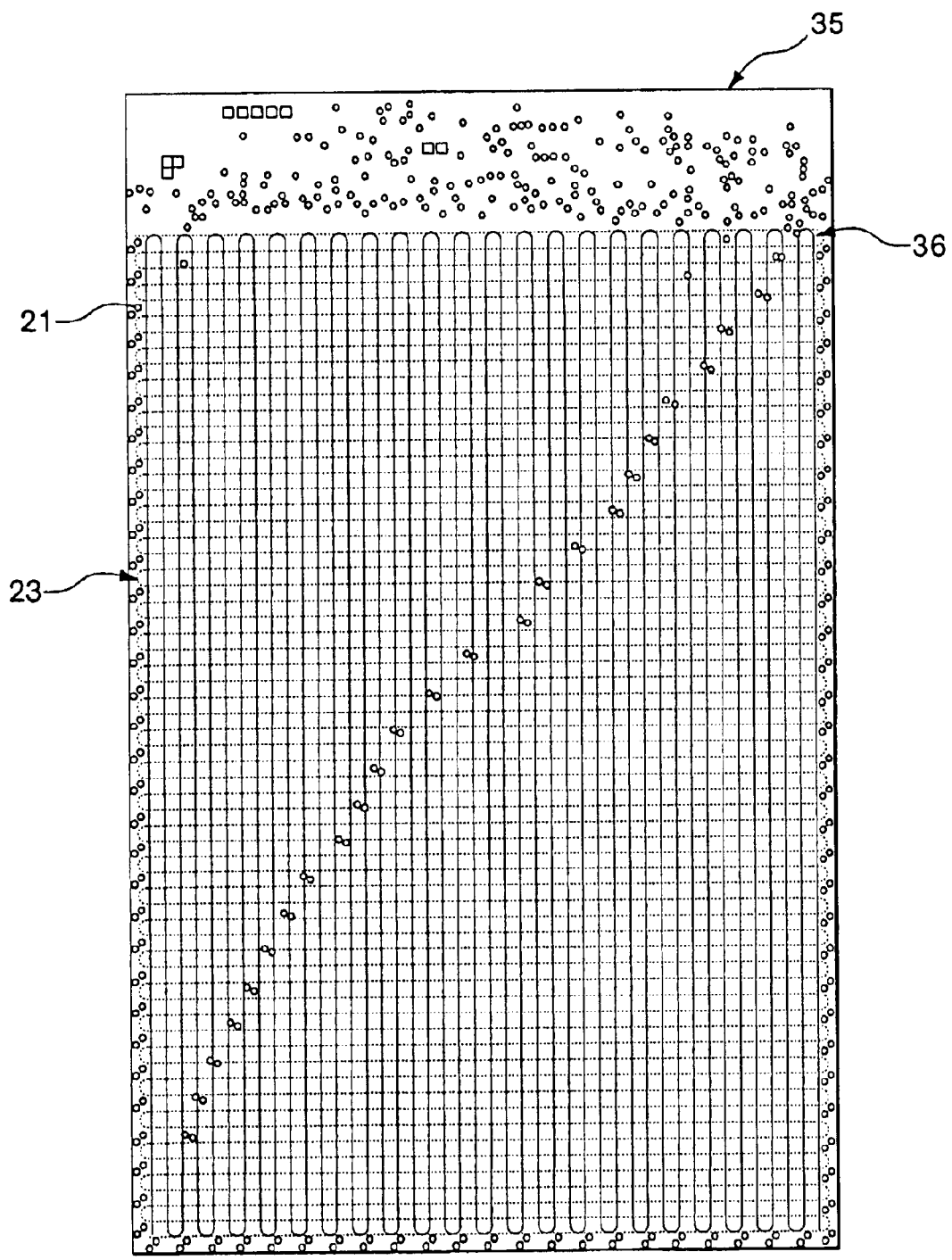
FIG. 1(b) is a planar view of an integrated printed circuit board assembly included in the palm pad system shown in FIG. 1(a)

In accordance with embodiments of the present invention, a portable palm pad system is set forth for enabling a user to electronically display, store, and retrieve hand written data.

Referring to FIG. 1(a), portable palm pad system 5 in accordance with one embodiment of the present invention comprises electronic notepad 10 coupled to a conventional PDD 15. Palm pad system 5 further includes pen 200, which is shown in FIGS. 3 and 4, and will be described in detail latter. Referring to FIG. 1 (a), one example of a conventional PDD 15 is a palm pilot, which is manufactured by 3COM. Electronic notepad 10 and PDD 15 coupled therewith are mounted on common base 20. Generally, PDD 15 includes a microprocessor (not shown), memory (not shown), display area 25 and input area 30. Display area 25 is typically comprised of a touch sensitive liquid crystal display ("LCD") 25a. Input area 30 typically has a number of control buttons 30a, which a user can actuate, to enter or display data on LCD 25a, conventional software, which is stored in the memory defined in PDD 15, is executed to manage data entry or data displaying operations. One example of such software is IBM's INK MANAGER SOFTWARE, which provides note editing, searching, organization and sharing tools. The control buttons 30A, LCD 25aand software are all associated with the PDD 15 and are known to those of ordinary skill in the art.

Referring further to FIGS. 1(a) and 1(b), electronic notepad 10 defined on palm pad system 5 includes integrated printed circuit board assembly ("PCBA") 35 adapted to securely hold an ordinary paper-pad 40 thereon. Paper-pad 40 can be written on just like any other ordinary paper-pad. PCBA 35 includes a plurality of etched loops 36 formed thereon. Etched loops 36 are uniformly distributed over the surface of PCBA 35 and form an X-grid pattern (not shown) and a Y-grid pattern (not shown). The X-grid pattern and the Y-grid pattern are coupled with position determining electronics 21. The PCBA 35 is powered parasitically through data bus 45 to PDD 15. Of course, many other methods can be employed to provide power to PCBA 35, including a separate power source. In an embodiment, the notepad includes four AAA batteries (not shown) that allow the notepad to operate for 3–4 months with moderate use.

Electronic notepad 10 and PDD 15 are coupled through an interface 50. According to an embodiment of the invention, interface 50 is a standard RS232 interface. As noted above, notepad 10 and PDD 15 can use a variety of communications technologies. PCBA 35 contained within notepad 10 transmits position and status information to PDD 15 through the interface 50 via data bus 45. The position and status information can include separate X and Y coordinates of pen 200 (FIGS. 3 and 4), which is adapted to cooperate with notepad 10, and the status of micro-switch (FIGS. 3 and 4) contained pen 200 (FIGS. 3 and 4). Furthermore, information directed to actuation of various controls 55 on notepad 10 can be communicated to PDD 15. Although not shown in the drawings, other interfaces can be employed to form a communication channel between electronic notepad 10 and PDD 15, for example, a substantially flat interface (not shown) can be integrated with the common base 20.

PDD 15 further includes software that operates to interpret the position and status information provided by PCBA 35. The software converts the position and status information received from PCBA 35 into an electronic copy of markings or writings composed by a user on paper-pad 40. The An electronic copy 24 of the markings or writings composed by the user can then be stored, retrieved and/or, as shown in FIG. 1(a), displayed on PDD 15, as with any other data received by the PDD. Alternatively, the notepad 10, as shown in FIGS. 1(a) and 1(b), can include software or hardware 23 disposed therein for processing the position and status information to create electronic copies 24 of markings or writings composed on the pad by a user. Then, only electronic copies 24 would be transferred to PDD 15 for storage, retrieval and display.

Figure 2A:
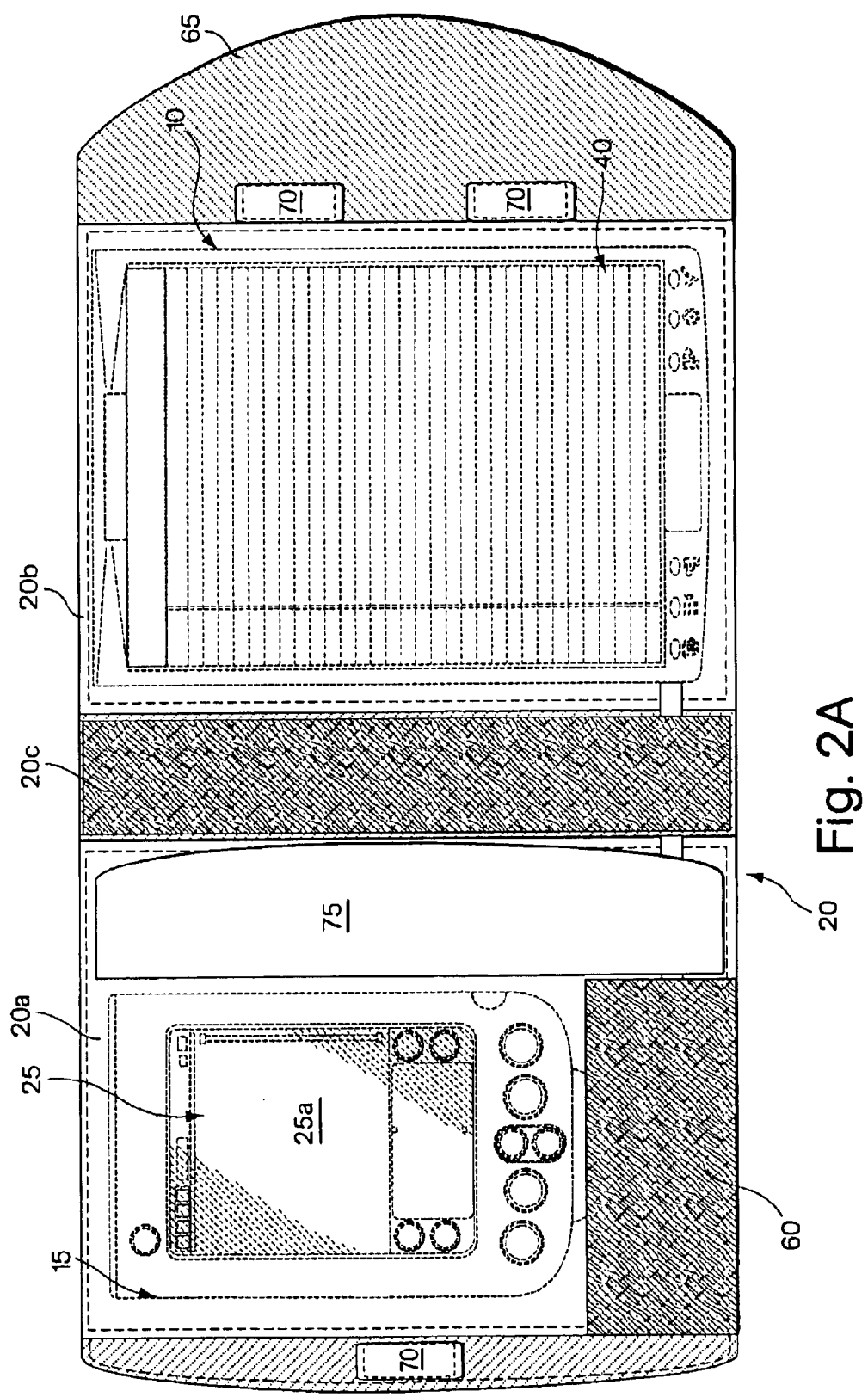
FIG. 2(a) is an isometric view of the palm pad system shown in FIG. 1(a)
Figure 2B:
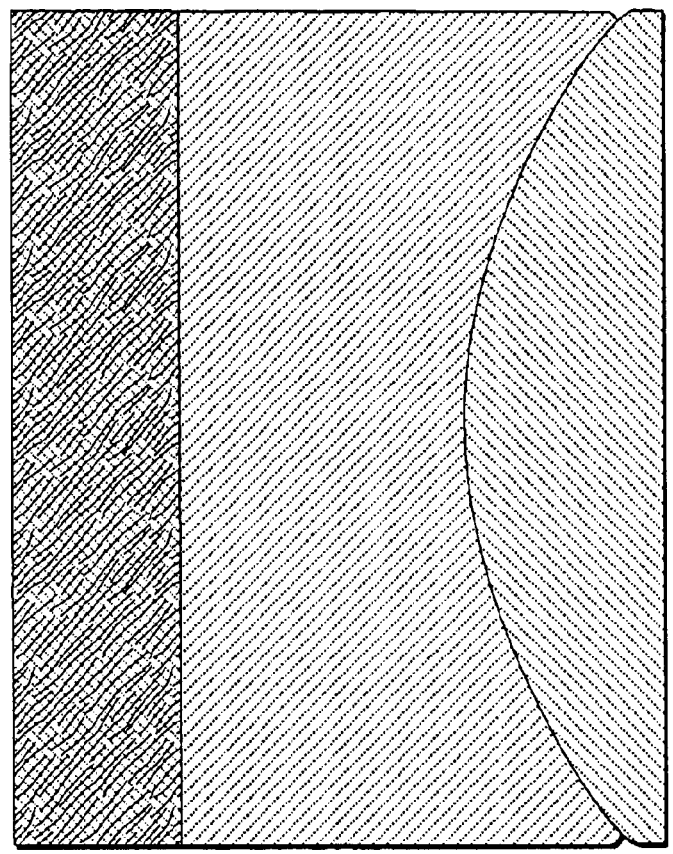
FIG. 2(b) is a folded view of the palm pad system shown in FIG. 2(a)
Figure 2C:
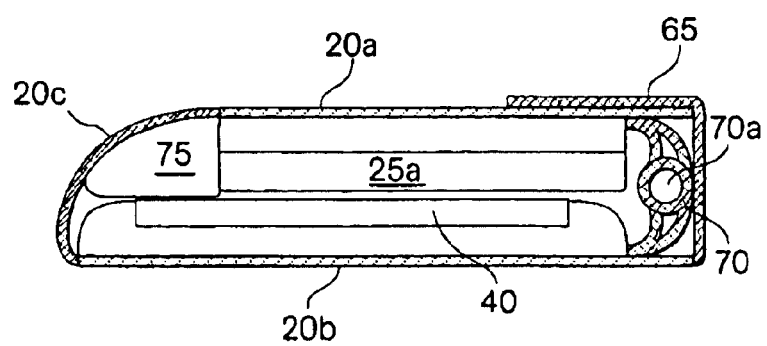
FIG. 2(c) is a side view of the palm pad system shown in FIG. 2(b)

Referring to FIG. 2(a), in an embodiment of the present invention, binder 20 includes PDD retaining surface 20a and notepad retaining surface 20b. Common base 20 can be formed of various materials including: leather, ballistic nylon and synthetics. PDD retaining surface 20a and notepad retaining surface 20b are coupled by a flexible section 20c. Flap 60 defined on common base 20 substantially encloses and protects interface 50 (FIG. 1(a), which enables communication between PDD 15 and notepad 10 via data bus 45. Both PDD retaining surface 20a and notepad retaining surface 20b can be folded towards each other, which bends flexible section 20c to orient the common base 20 into a folded position as shown in FIG. 2(b). At least one tab 65, with an appropriate closure mechanism can be used to hold common base 20 in the folded position as shown in FIG. 2(c). FIG. 2(c) further shows a set of loops 70 defined on flexible portion 20c of common base 20. When common base 20 is folded, loops 70 form a space 70a. Space 70a can accommodate a cylindrical object such as pen 200 (FIGS. 3 and 4). Common base 20 further includes an additional power supply retaining structure 75 adapted to retain batteries (not shown or other power supply in a secure position defined on common base 20.

Figure 3A:
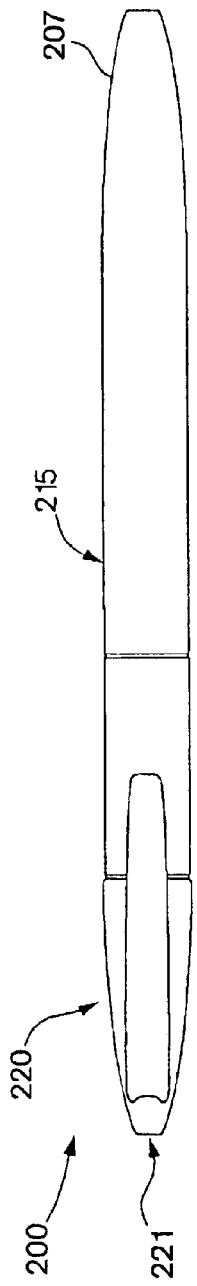
FIG. 3(a) is an isometric view of one embodiment of a pen, which is adapted to cooperate with the palm pad system of FIG. 1(a)
Figure 3B:
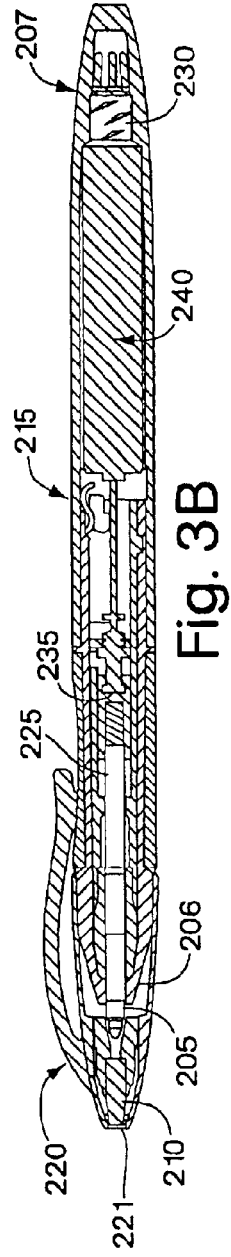
FIG. 3(b) is a cross sectional view of the pen shown in FIG. 3(a)

FIGS. 3(a) and 3(b); 4(a) and 4(b) show embodiments of a pen 200 used in conjunction with embodiments of the present invention. U.S. Pat. No. 5,434,371, issued to Brooks and incorporated herein by reference, teaches a hand-held electronic writing implement including a writing tip for marking a surface and a pressure sensor located at the writing tip for emitting a pressure signal once the writing tip contacts the writing surface. Furthermore, U.S. Pat. No. 5,635,682 issued to Cherdak et al. and incorporated herein by reference, teaches a wireless stylus and disposable stylus cartridge for use with a pen computing device. The hand-held electronic writing implement set forth in U.S. Pat. No. 5,434,371 and the wireless stylus and disposable stylus cartridge set forth in U.S. Pat. No. 5,635,682 can be adapted for use with embodiments of the present invention.

In an embodiment of the present invention, the pen 200 includes an ordinary writing tip 205 defined at a first end 206 of the pen, which writing tip 205 can write on paper pad 40 (FIG. 1 (a), and rubber tip 210 or non-writing tip which makes no marks. More specifically and referring to FIG. 1(a) as well as to FIGS. 3(a) and 3(b), pen 200 includes body 215 and cap 220. The body 215 houses ink supply 225 connected to writing tip 205. Ink supply 225 and writing tip 205 can be comprised of many ordinary forms for pens, such as a replaceable cartridge with a ball point tip. Body 215 also houses electromechanical transmitter 230. Transmitter 230 provides a signal used by notepad 10 to determine the status and position of pen 200. The signal is frequency encoded to relay the status of writing tip 205 and a side switch (not shown). All frequencies are set within the frequency range of 335 to 500 kHz, and are assigned in a manner to allow enough tolerance to eliminate the need for tuning each pen 200. The status of writing tip 205 is determined by micro switching mechanism 235. Switching mechanism 235 is operable when writing tip 205 contacts paper pad 40. The pressure of writing tip 205 on paper pad 40 is sufficient to activate switch 235 and transmitter 230.

Figure 4A:
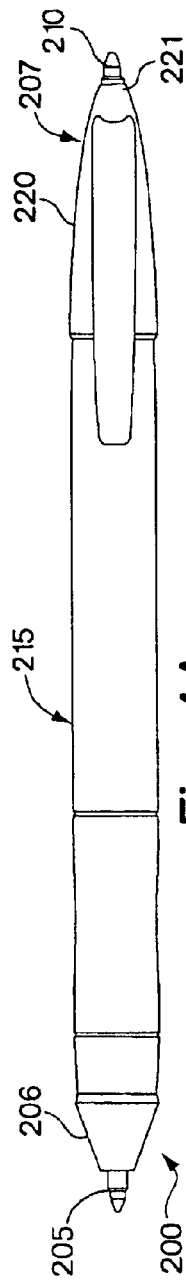
FIG. 4(a) is an isometric view of another embodiment of a pen, which is adapted to cooperate with the palm pad system of the present invention.
Figure 4B:
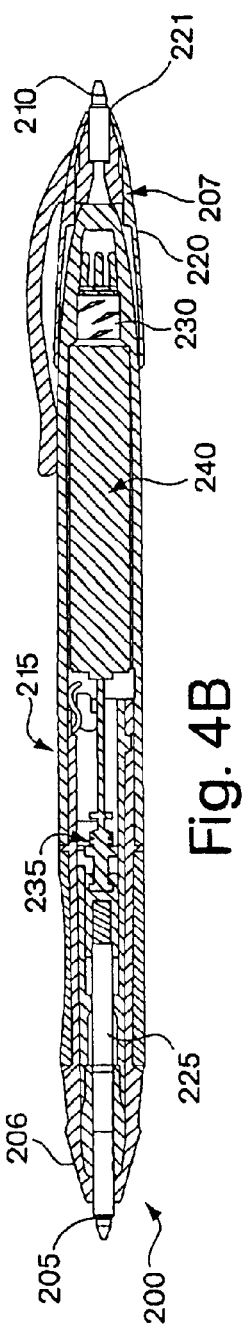
FIG. 4(b) is a cross sectional view of the pen shown in FIG. 4(a)

Non-writing tip 210 is retractably mounted in cap 220 and is adapted for use with the touch sensitive display 25a which is associated with PDD 15. When cap 220 is positioned over writing tip 205, non-writing tip 210 is retracted within cap 220 as shown in FIG. 3(b). When cap 220 is positioned over second end 207 of pen 200, which is defined diametrically opposite from writing tip 221, second end 207 thereof cooperates with non-writing tip 210 to force non-writing tip 210 to extend outwardly from aperture 221 defined on cap 220 as shown in FIGS. 4(a) and 4 (b). Therefore, when the user removes cap 220 from writing tip 205 to begin writing on notepad 10, the user can also position cap 220 over second end 207 of pen to extend non-writing tip 210 outwardly from aperture 221 defined on cap 220, which non-writing tip 210 can be used to operate touch sensitive display 25a and/or control buttons 30a (FIG. 1(a) associated with PDD 15. Pen 200 can include a single AAA battery 240, which provides pen 200 with a 6–12 month average life.

During use of writing tip 205, writing tip 205 is pressed against paper-pad 40 for actuating micro-switch 235 to enable transmitter 230 to provide a signal. The signal provided by transmitter 230 is communicated to the etched loops 36 defined on PCBA 35. The relative amplitudes of the received signals on individual etched loops 36 are used as inputs to algorithms (not shown) which determine writing tip's 205 relative location on paper-pad 40. Therefore, when a user composes handwritten data by moving writing tip 205 of pen 200 over paper-pad 40, the algorithms determine writing tip's 205 relative location on paper-pad 40. The relative locations of writing tip 205 are further processed to concomitantly reproduce and electronically display the handwritten data on display 25a associated with PDD 15. The electronically reproduced data can further be saved as an electronic file, which file can be retrieved at a later time. More simply stated, a user's hand written notes, which are written on paper-pad 40, are concomitantly displayed on touch sensitive display 25a associated with PDD 15. Thereafter, the user's handwritten notes can be electronically stored to and retrieved from memory which is associated with PDD 15.

Figure 5A:
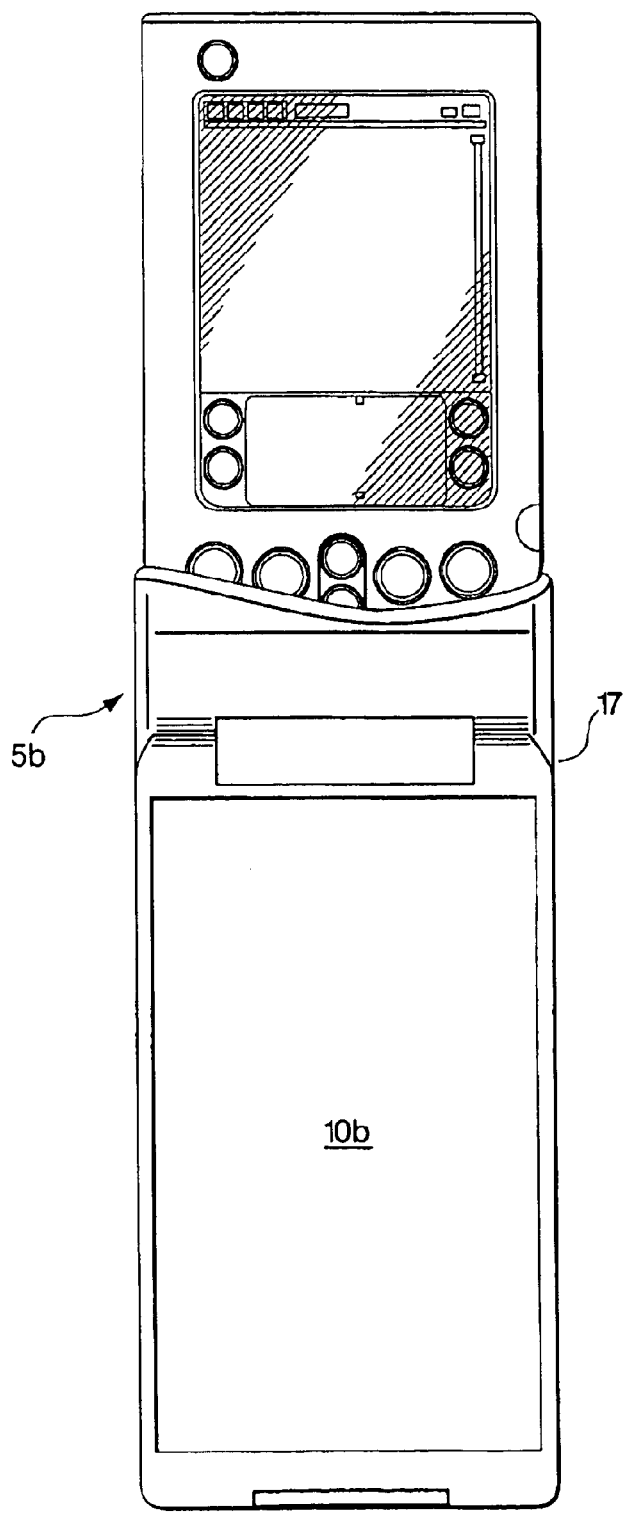
FIGS. 5(a), 5(b), 5(c), and 5(d) shows various views of a PDD integrated with a flip-down electronic notepad in accordance with another embodiment of the present invention.
Figure 5B:
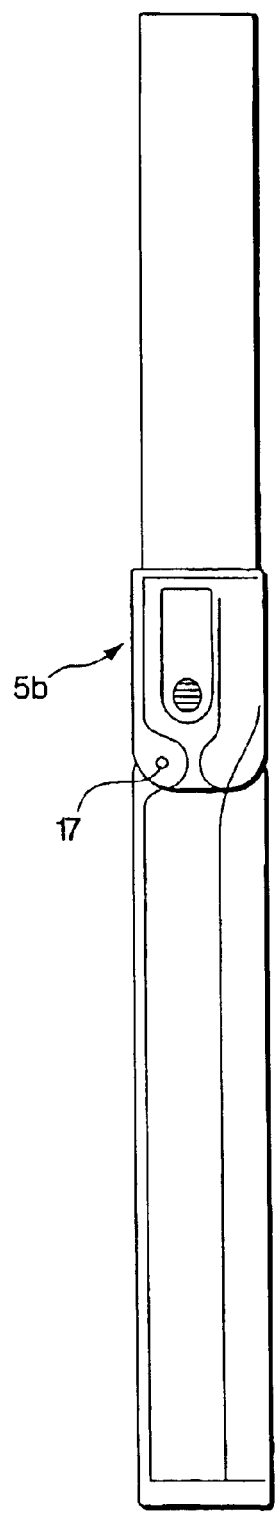
Figure 5C:
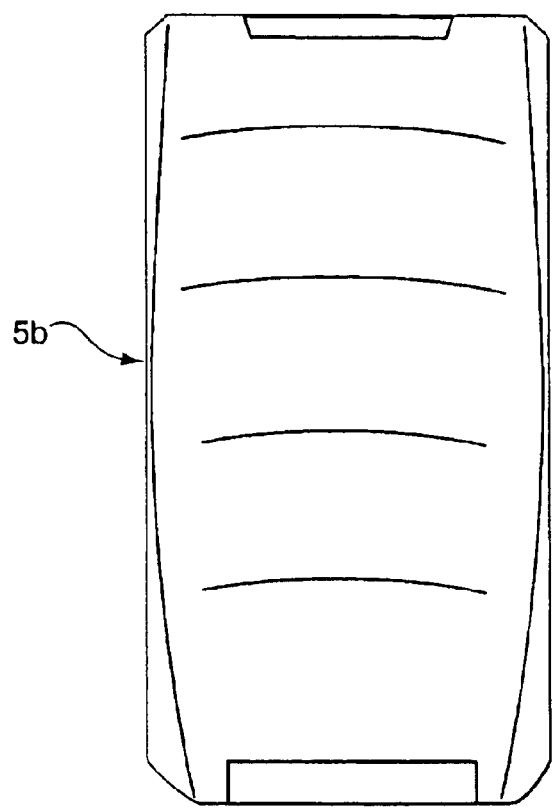
Figure 5D:
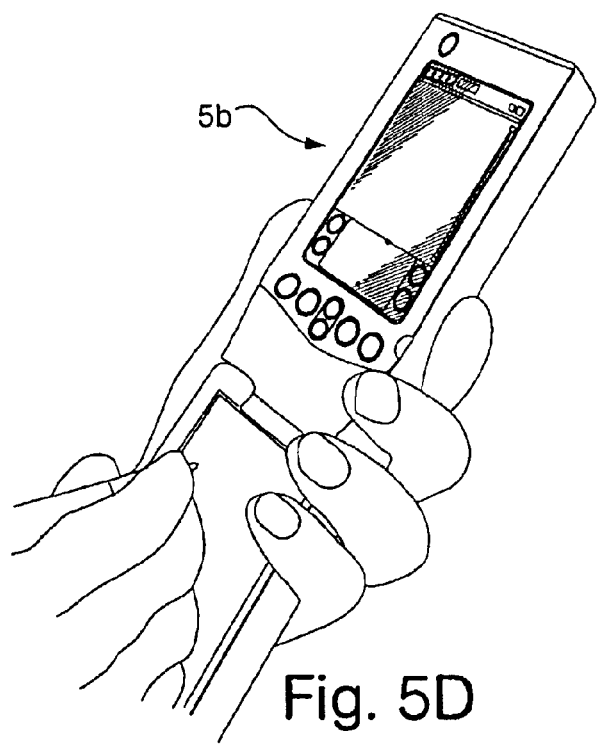

FIGS. 5(a), 5(b), 5(c), and 5(d) show various views of another embodiment of palm pad system 5b according to principles of the present invention. More specifically and referring to FIG. 5(a), palm pad system 5b includes a conventional PDD 15b having a pivotal flip-down connection 17 to electronic notepad 10b. A flexible data communication bus (not shown) connected between PDD 15b and notepad 10b enables data communication between PDD 15b and notepad 10b. FIG. 5(b) is a side view of palm pad system 5b. FIG. 5(c) shows palm pad system 5b in a closed position. FIG. 5(d) is an isometric view of palm pad system 5b positioned in a user's hand during use.

Figure 6:
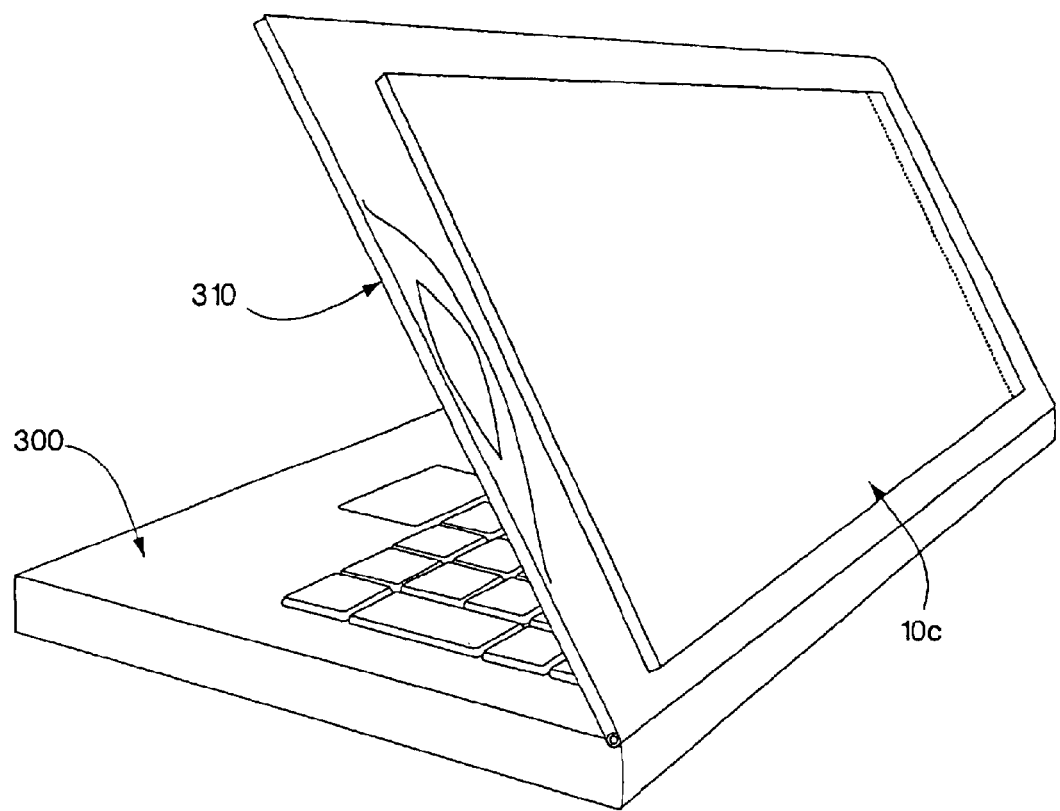
FIG. 6 is an isometric view laptop computer integrated with an electronic notepad.

Referring to FIG. 6, another embodiment of the present invention includes the integration of electronic notepad 10c with laptop computer 300. Electronic notepad 10c can be coupled to a conventional processor (not shown) as well as conventional memory (not shown) contained within laptop computer 10c. Such a configuration allows a user to take handwritten notes on electronic notepad 10 c and electronically store the notes in laptop computer 300. Thereafter, the stored notes can be retrieved and displayed on a screen 310 associated with laptop computer 300.

Figure 7:
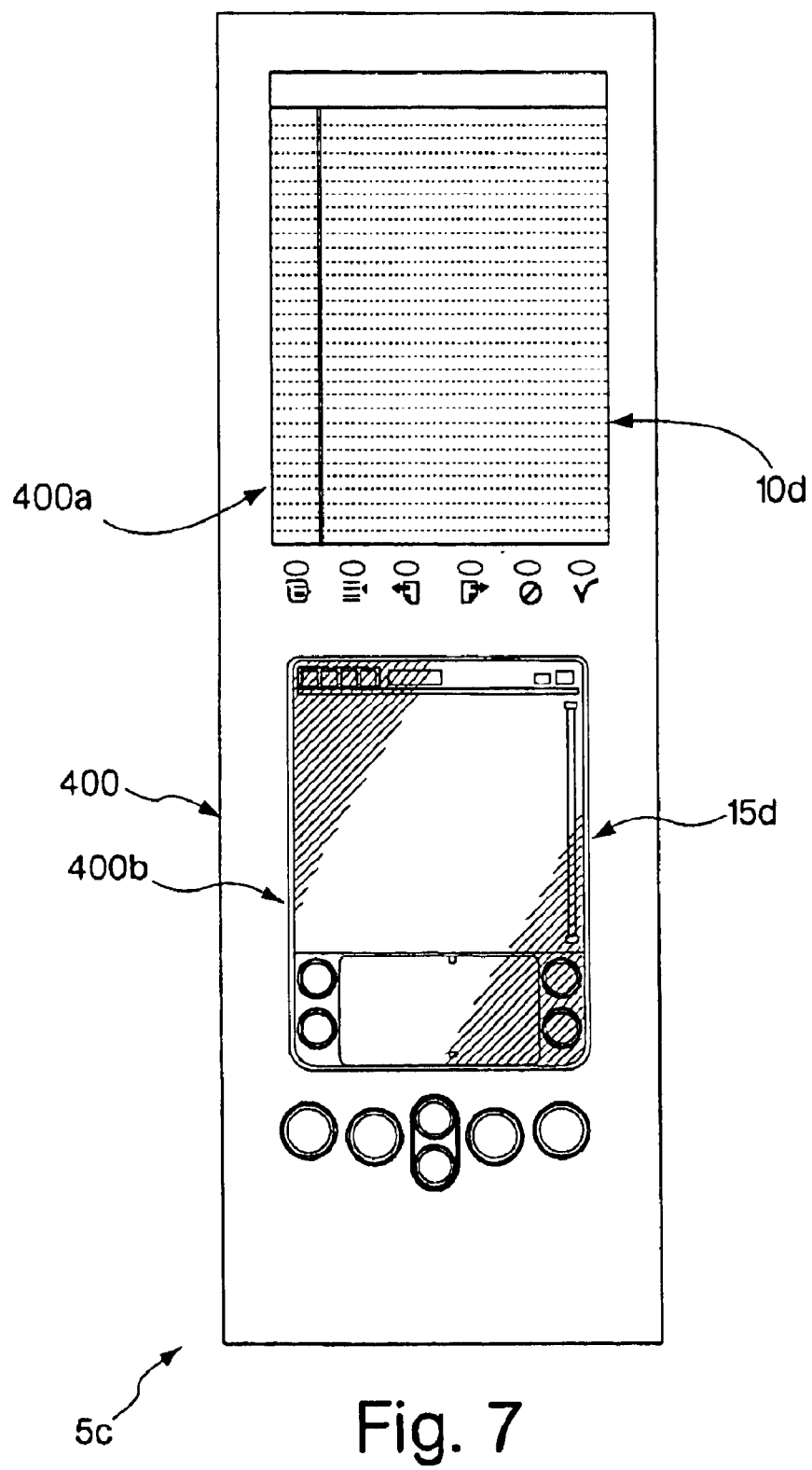
FIG. 7 is a planar view of a fully integrated palm pad system.

Referring to FIG. 7, another embodiment of the present invention includes a fully integrated palm pad system. Integrated palm pad system 5C includes a substantially rigid housing 400 containing electronic notepad 10d and PDD 15d. Electronic notepad 10d is positioned adjacent to a first window defined on housing 400 and PDD 15d is positioned adjacent to a second window defined on housing 400. Although not shown in FIG. 7, the electronic notepad 10d and PDD 15d are coupled together by a data bus which operates in a similar manner as that previously described in earlier embodiments.

The above described palm pad system 5 has many advantages over the prior art such as enabling handwritten notes to be converted into an electronic file or pages which can be stored and/or retrieved in the memory of PDD 15. The electronic file can further be displayed on a touch sensitive display 25a associated with PDD 15.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for enabling a user to electronically enter, display, store and retrieve handwritten data, comprising:
    a base having a centrally positioned elongated flexible portion to permit the base to be folded substantially in half in a book-like manner, the base defining a left-hand portion and a right-hand portion on either side of the elongated flexible portion, the right-hand portion having a first object-retaining surface and the left-hand portion having a second object-retaining surface;
    an electronic notepad removably mounted to one of the object-retaining surfaces, the electronic notepad having one or more controls, a processor, a memory, a sensing surface and a writing surface, the writing surface being removably positioned over the sensing surface;
    the sensing surface, the processor and the memory being configured and arranged to detect a signal transmitted by a combination writing and signal transmitting instrument through the writing surface when the user contacts the instrument to the writing surface to store in the memory each position of the instrument on the writing surface as the user moves the instrument across the writing surface to handwrite thereon;
    a personal digital device removably mounted to the other of the object-retaining surfaces, the personal digital device having a processor, a memory, a display area, and an input area, the input area including one or more controls to control one or more functions of the personal digital device,
    an interface operatively connecting the electronic notepad to the personal digital device,
    the electronic notepad electronically communicating, under control of the processor, each detected and stored position of the instrument on the writing surface through the interface to the personal digital device, the display area of the personal digital device displaying each communicated and detected position as handwritten data on the display area, and the memory of the personal digital device storing each detected and communicated position as a retrievable electronic handwritten data file;
    further comprising a power supply removably mounted to the object-retaining surface on which the personal digital device is removably mounted, the power supply being operatively connected to the personal digital device, and a data bus operatively connecting the electronic notepad to the interface whereby the electronic notepad receives power; and
    further comprising an internal flap extending from a lower bottom edge of the objecting-retaining surface on which the personal digital device is removably mounted to substantially enclose the data bus.

2. The system of claim 1, wherein the sensing surface includes a plurality of etched loops substantially uniformly distributed over a surface of the sensing surface in contact with the writing surface and arranged in a grid pattern, the etched loops being configured to receive the signal transmitted by the combination writing and signal transmitting instrument and to communicate the signal to the processor and the memory as a detected X coordinate and a detected Y coordinate of the grid pattern to indicate the position of the combination writing and signal instrument on the writing surface.

3. The system of claim 1, wherein the signal transmitted by the combination writing and signal transmitting instrument includes a radio frequency (RF) signal.

4. The system of claim 1, wherein the base is constructed of a suitable material selected from a group consisting of leather and synthetic material.

5. The system of claim 1, wherein the base further includes a flap portion connected to an outer edge of one of the left-hand and the right-hand portions of the base such that when the base is folded in the book-like manner the flap portion wraps around a width defined by the base, the electronic notepad and the personal digital device and removably connects to a fastener joined to another of the left-hand and the right-hand portions of the base to secure the base in a folded position.

6. The system of claim 1, wherein the display area of the personal digital device includes a touch sensitive liquid crystal display.

7. A system for enabling a user to electronically enter, display, store and retrieve handwritten data, comprising:
    a base having a centrally positioned elongated flexible portion to permit the base to be folded substantially in half in a book-like manner, the base defining a left-hand portion and a right-hand portion on either side of the elongated flexible portion, the right-hand portion having a first object-retaining surface and the left-hand portion having a second object-retaining surface;
    an electronic notepad removably mounted to one of the object-retaining surfaces, the electronic notepad having one or more controls, a first processor, a first memory, a sensing surface and a writing surface, the writing surface being removably positioned over the sensing surface;
    the sensing surface, the first processor and the first memory being configured and arranged to detect and to store a signal transmitted by a combination writing and signal transmitting instrument through the writing surface when the user contacts the instrument to the writing surface to store in the first memory each position of the instrument on the writing surface as the user moves the instrument across the writing surface to handwrite thereon;
    a personal digital device removably mounted to the other of the object-retaining surfaces, the personal digital device having a second processor, a second memory, a display area, and an input area, the second processor and the second memory being configured and arranged to detect and to store data and being operatively independent of the first processor and the first memory, and the input area including one or more controls to control one or more functions of the personal digital device and to enter data into the second memory; and an interface operatively connecting the electronic notepad to the personal digital device such that the electronic notepad electronically communicates, under control of the first processor, each detected and stored position of the instrument on the writing surface through the interface to the personal digital device, the display area of the personal digital device displaying each communicated and detected position as handwritten data on the display area, and the second memory of the personal digital device storing each detected and communicated position as a retrievable electronic handwritten data file.

* * * * *